(No Model.) 2 Sheets—Sheet 1.
J. A. RUBE & H. BARTHOLOMEW.
ICE CREAM FREEZER.
No. 456,910. Patented July 28, 1891.
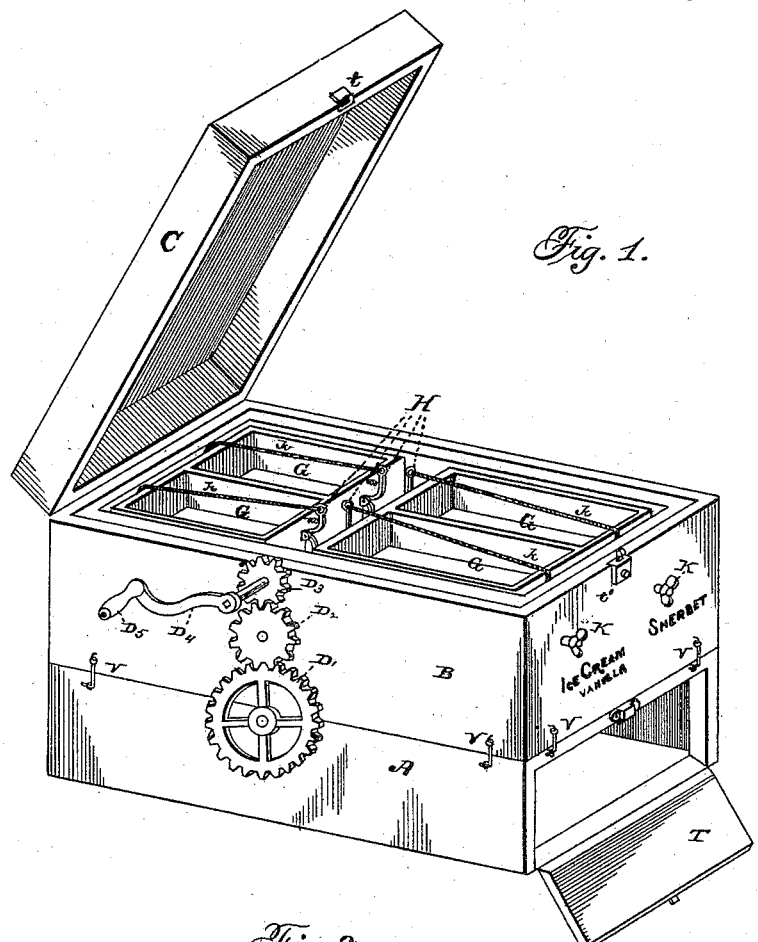

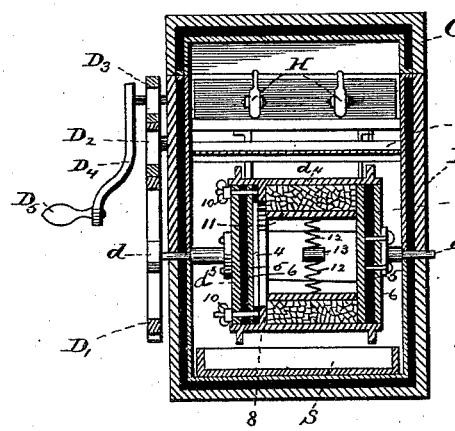

UNITED STATES PATENT OFFICE.

JOHN A. RUBE AND HENRY BARTHOLOMEW, OF BEEBE, ARKANSAS; SAID RUBE ASSIGNOR TO J. F. NORMAN, OF KNOXVILLE, ARKANSAS.

ICE-CREAM FREEZER.

SPECIFICATION forming part of Letters Patent No. 456,910, dated July 28, 1891.

Application filed April 13, 1891. Serial No. 388,730. (No model.)

*To all whom it may concern:*

Be it known that we, JOHN A. RUBE and HENRY BARTHOLOMEW, citizens of the United States, residing at Beebe, in the county of White and State of Arkansas, have invented certain new and useful Improvements in Ice-Cream Freezers; and we do hereby declare the following to be a full, clear, and exact description of the invention, such as will enable others skilled in the art to which it appertains to make and use the same.

Our invention relates to freezers used for ice-cream, sherbets, &c.; and it has for its object the providing of a combined refrigerator and freezer in which the process of refrigeration or of freezing may be carried on with economy, rapidity, and convenience.

The peculiarities and advantages of our improved refrigerator and freezer will be better understood after referring to the accompanying drawings, wherein the same parts are indicated by the same letters and figures.

Figure 1 represents a perspective view of the box or case inclosing the freezer, the refrigerator-lid being raised and the ice-cream panel open. Fig. 2 represents a vertical longitudinal section through the same. Fig. 3 represents a transverse vertical section through the axis of the freezer. Fig. 4 represents a perspective view of the freezer barrel or cylinder detached, with the head removed. Fig. 5 represents a perspective view of the outwardly-acting holding-plates for the ice. Fig. 6 represents a side view of the lower half of the box after the refrigerator-top has been removed. Fig. 7 represents one of our valves for controlling the flow of liquid on the freezer. Fig. 8 represents a perspective view of our improved spreader for the article to be frozen. Fig. 9 represents a perspective view of the rubber gasket for packing the head of the freezer-cylinder. Fig. 10 represents a perspective view of the scraper. Fig. 11 represents a perspective view of the chute for discharging the frozen material. Fig. 12 represents a support for the ice-cylinder when it is being filled, being a stool with a small hole in its center.

The box or case is made in three separate sections, the base A carrying the rotating freezer, the middle portion B carrying the scraper, spreader, and frame-work for the pans containing the articles to be cooled or frozen, and the lid C. Each of the three sections of the box is composed of an outer casing of wood 1, a central lining of felt 2, and an interior casing of tin, lead, or other metal 3. Fitting in semicircular bearings in the sides of A and B we have journals $d$ and $d'$ for the freezer D. On the end of the journal $d$ we have a cog-wheel $D'$, meshing with an idler $D^2$, which is turned by the pinion $D^3$, crank $D^4$, and handle $D^5$. The said journals $d$ and $d'$ are secured to the heads $d^2$ and $d^3$ of the freezing-cylinder D. Of these heads $d^2$ is permanently attached to the metallic shell $d^4$, inclosing the cylinder D, and is preferably of a double thickness of wood, inclosing a heavy layer of felt. The head $d^3$ is removable, and is formed of three thicknesses on the interior lining 4 of tin or other metal, separated by a thickness of felt 5 from a wooden disk 6, to which the journal $d$ is attached. A rubber gasket 7, resting on the flange 8 on the interior of the cylinder D, acts as a packing to the cylinder-head, while the stud-bolts 9 and thumb-screws 10 hold the said head in place. On the interior of the cylinder we provide a plurality of metal strips 11, forming longitudinal strips of hollow cylinders, said strips overlapping each other, as shown in Fig. 2, and being normally distended by spring 12, connected to a loose hub or shaft 13 contained within the cylinder. While we have shown four of said metal strips and eight of said springs, the number of either and also the shape of the springs are unimportant. These strips 11 fit so as to move freely from and toward the center of the cylinder. Between these strips and the outer shell $d$ of the freezer-cylinder the ice E, mixed with salt, is placed. The function of these movable plates or strips and the extensory-springs is to keep the ice constantly pressed against the interior surface of the freezing-cylinder, and so get the maximum freezing effect. It will be seen that as the ice melts the springs will expand, forcing what ice remains outward.

On the exterior of the revolving cylinder D we have two ribs or flanges 13, which act as side walls to the freezing-surface and limit the lateral flow of the mixture before it is frozen.

In the ends of the box, above the level of the top of the cylinder $d^4$, we have two transverse shelves F, which do not meet by several inches, immediately over the said cylinder. On these shelves are placed pans G for the material to be cooled or frozen. These pans we have shown as consisting of two main supply-boxes partitioned off longitudinally, so that various liquids to be frozen may be used or variously-flavored varieties of the same liquid. These pans should preferably slope somewhat toward their inner ends, where we have provided a hole $g$, with valve H closing the same. The construction of this valve is shown in Fig. 7, where $h$ is a lever-arm pressed out normally by the spring $h'$. The other arm has a rubber pad $h^2$, closing the hole $g$. The lever is pivoted at $h^3$ to the pan G. Attached to the upper arm of the said lever we have a string or wire $k$, which leads to a hand-screw K, set in a bouching $k'$ in the box. By winding the string or wire on the inner end $k^2$ of the screw-key K the flow of liquid through the hole $g$ may be controlled at will. Thus when the cylinder is very cold the valve may be opened wider and the cylinder revolved faster. When the revolution is stopped, the valve should be closed. Beneath the said holes $g$ we have an inclosed trough $m$, with perforations over the freezing-cylinder. This trough tends to spread the liquid somewhat after it flows past the said valve. After it gets on the surface $d^4$ (which is revolving in the direction shown by the arrow) the liquid is spread uniformly over the said surface by the spreader N. This consists of a corrugated piece of metal $n$, Fig. 8, held by an arm $n^2$, Fig. 2, attached to the shelf F, the furrows of the said corrugations being tangential to the surface of the said revolving cylinder. Over one end of these furrows we have a rubber band $n'$, which scrapes off the upper portions of the lumps of cream or other matter and levels the surface of the same. The corrugations in the metal are to allow the raised portions of the cream to pass through.

The thickening liquid adheres to the surface $d^4$, and by the time the scraper P is reached has become frozen. This scraper is a broad sheet of resilient metal attached to a cross-piece $p'$, which goes across the box and is secured to the sides thereof. On the back of this sheet of metal we place a spring or springs $p^2$, which keep the edge of the scraper pressed close against the surface $d^4$. As the cylinder revolves the frozen matter strikes this scraper, and, being thrown forward thereby, falls on the chute Q and slides into the dish or other receptacle R. This receptacle is withdrawn through the door or panel T, having catch $t$.

S is a drip-pan to catch any waste material. V V V are hooks fastening A and B together.

$t'$ is a spring-catch for the lid C, which is hinged at $c$.

The operation of our invention is as follows: Disengage the hooks V and lift B and C bodily from A. Take out the cylinder D and put the journal $d'$ in the hole $z$ of the stool Z. (Said stool may be replaced by an earthenware jar, a bucket, an iron pot, or any other convenient hollow vessel.) Unscrew the thumb-screws 10. Take off the head $d^3$, and, pressing back the plates 11, fill the space between said plates and the interior of the cylinder with cracked ice, preferably in good-sized lumps. When the supply of ice has been nearly uniformly put in, add salt in proper quantities. Screw down the head $d^3$. Put the cylinder back in place. Put the upper half on the box. Put the material to be cooled or frozen in the pans G. Open one of the valves H and begin turning on the crank $D^4$. The thin layer of liquid falling on the cylinder is frozen before it reaches the scraper P, when it is scraped off and falls into the chute Q and vessel R. The frozen material may be withdrawn through the panel T in large or small quantities, as may be desired.

Where only a small quantity of material is to be frozen, we charge the cylinder with a small supply of ice, the outward pressure of the extensory-plates keeping the ice always in contact with the freezing-surface, and thus within certain limitations rendering the temperature attained independent of the quantity of ice consumed.

It will be readily seen that by placing molds of jelly or other materials to be cooled either in the pans G or in the bottom of the box A they may be readily and rapidly cooled and with a very small quantity of ice.

By having a number of pans with separate delivery-valves various kinds of ice-cream, sherbet, &c., may be made in one freezer without removing the lid, and, moreover, the liquid is brought to a low temperature and hence adapted to be readily frozen before being dropped on the freezing-cylinder, thus insuring both rapidity and economy in the operation of the device.

By having a well-insulated case and cylinder-heads, with our system of pressing the freezing-mixture from the interior to the cooling-surface, we find that there is great economy both in diminishing the amount of useless radiation and in decreasing the quantity of ice required. Moreover, the freezing will continue as long as there is any ice in the cylinder.

For ordinary purposes of refrigeration the salt may be omitted and the cylinder packed merely with ice, in which case the cold will not be so intense, but the ice will last longer.

Having thus described our invention, what we claim, and desire to secure by Letters Patent of the United States, is—

1. In an ice-cream freezer, the combination, with a horizontal cylinder for the freezing-mixture, said cylinder having a metallic shell, of a plurality of movable curved plates contained in the said cylinder, and springs pressing said plates outward and holding the ice between said plates and said shell, substantially as described.

2. In an ice-cream freezer, the combination, with a horizontal cylinder for the freezing-mixture, said cylinder having a metallic shell and insulated heads, of a plurality of movable curved plates contained in the said cylinder, and springs pressing said plates outward and holding the ice between said plates and said metallic shell, substantially as described.

3. In an ice-cream freezer, the combination, with a horizontal cylinder for the freezing-mixture, said cylinder having a metallic shell and insulated heads, of a plurality of movable curved plates contained in said cylinder, spiral springs connected to a loose hub or shaft, said springs pressing said plates outward and holding the ice between said plates and said metallic shell, substantially as described.

4. In an ice-cream freezer, the combination, with a suitable case having journal-bearings therein, of a horizontal revoluble freezing-cylinder having a metallic shell, a plurality of movable curved plates contained in said cylinder, and springs pressing said plates outward toward said metallic shell for the purpose of pressing the ice against said shell, substantially as described.

5. In an ice-cream freezer, the combination, with a suitable case having journal-bearings therein, of a horizontal revoluble freezing-cylinder inclosed therein, said cylinder having a metallic shell, plates pressed outward by a spring in the cylinder and pressing the ice against said shell, a journal attached to each head of said cylinder, a cog-wheel on one of said journals, an idler meshing in said cog-wheel, and a pinion actuated by a hand-crank meshing in said idler and driving said idler and cog-wheel, substantially as described.

6. In an ice-cream freezer, the combination, with a horizontal revolving cylinder containing the freezing-mixture and having raised flanges thereon, of a spreader made of corrugated metal, with a rubber band stretched across said corrugations, said spreader being held at a fixed distance from the surface of said cylinder and extending between said flanges, substantially as described.

7. In a combined refrigerator and ice-cream freezer, a box made of wood lined with felt and faced internally with sheet metal, said box being divided horizontally into three sections, the lower section containing the freezing-cylinder and having a panel for the withdrawal of the frozen material, the central section containing the supply-vessels for the freezer and vessels for the articles to be cooled and being removably mounted on the first section, the third section forming a hinged lid mounted on the second section, substantially as described.

In testimony whereof we affix our signatures in presence of two witnesses.

JOHN A. RUBE.
HENRY BARTHOLOMEW.

Witnesses:
S. M. TURNER,
J. F. NORMAN.